United States Patent [19]

Straub

[11] Patent Number: 4,558,886
[45] Date of Patent: Dec. 17, 1985

[54] FLUID CIRCUIT MEANS FOR ELEVATING THE REAR END OF AN AIR RIDE TRUCK TRAILER

[76] Inventor: Gerald J. Straub, 6969 Madden Rd., Dexter, Mich. 48130

[21] Appl. No.: 534,736

[22] Filed: Sep. 22, 1983

[51] Int. Cl.[4] ............................................. B60G 5/00
[52] U.S. Cl. .................................. 280/711; 280/6 R; 280/702; 280/709
[58] Field of Search ............... 280/711, 702, 709, 6 R, 280/6 H

[56] References Cited

U.S. PATENT DOCUMENTS 3,013,809  12/1961  Szostak ................................ 280/711
3,025,077   3/1962  Alfieri ................................. 280/711
3,044,762   7/1962  Stengelin ............................. 280/711

Primary Examiner—Richard A. Bertsch
Attorney, Agent, or Firm—James M. Deimen

[57] ABSTRACT

Fluid circuit means to elevate the rear end of a truck trailer are incorporated in the air ride suspension means for the truck trailer and in communication with the air brake or spring brake fluid circuitry. The fluid circuitry provides manually controllable means to elevate the bed of the truck trailer at the rear thereof when the truck trailer is parked.

The fluid circuitry is in communication with the spring brake fluid circuitry to prevent elevation of the truck trailer when the truck trailer parking brakes are not applied. The fluid circuitry provides a manually controllable connection bypassing the leveling valves to raise the truck trailer by admitting additional air under pressure into the air ride bags supporting the trailer. The fluid circuitry connections assure that the elevating system will be released and the excess air in the air ride bags exhausted automatically when the spring brake circuitry is pressurized to release the trailer parking brake. The connection with the spring brake circuitry is a safety feature in the event the operator does not release the manual control for the elevating means prior to releasing the parking brakes on the trailer.

6 Claims, 2 Drawing Figures

4,558,886

FLUID CIRCUIT MEANS FOR ELEVATING THE REAR END OF AN AIR RIDE TRUCK TRAILER

BACKGROUND OF THE INVENTION

The field of the invention pertains to truck trailers having air ride suspension systems and in particular to air ride tandem truck trailers incorporating means to elevate or lower the rear end of the bed of the truck trailer so as to meet a loading dock or other platform adjacent to the bed of the trailer.

The typical tandem axle air ride trailer suspension comprises four air ride bags which act as fluid springs supporting the bed of the trailer. An air bag is adjacent to each of the four wheel sets of the tandem suspension. On each side of the tandem suspension the two air bags are in fluid communication with a leveling valve having mechanical means to sense the lateral tilt of the trailer bed with respect to the tandem axles. The leveling valves in turn are in communication with a source of pressurized air which completes the air ride system. Typically, the source of air pressure is the air brake system including the air brake reservoir of the truck and trailer combination. To prevent failure of the air ride circuitry from affecting the air brake system of the truck trailer combination, a brake protection valve is inserted in the circuit between the air brake rservoir and the air ride suspension fluid circuitry.

In addition to the air ride fluid circuitry, the brake system for the tandem trailer includes fluid circuitry leading to each spring brake chamber for each of the wheel sets. To release the spring brakes or parking brakes, the fluid circuitry leading thereto is pressurized from the air brake system of the truck trailer combination.

SUMMARY OF THE INVENTION

The invention comprises fluid circuit means to elevate the bed of a truck trailer equipped with air bag suspension means and air brakes. The fluid circuitry for elevating the trailer bed utilizes the trailer air brake pressurization system as a source of high pressure air and a manually controllable valve to permit the operator to raise and lower the trailer bed by providing additional pressurization to the air ride suspension system. The manually controllable valve circuit includes a pressurized fluid activated safety inter-connection with the trailer parking brake and a bypass circuit and valve system to bypass the trailer leveling valve when the elevating circuit is pressurized. The safety inter-connection fluid circuit automatically exhausts the bypass elevating circuit whenever the spring brake chamber of the trailer parking brake is pressurized thereby preventing operation of the elevating circuit when the trailer parking brakes are released. Thus, the elevating circuit cannot be inadvertently left on without the parking brakes being simultaneously applied and the trailer cannot be moved unless the elevating circuit is released.

The elevating fluid circuitry and valve combination is completely integrated with the air ride suspension system for the truck trailer thereby eliminating the need for any duplication of fluid circuitry with the leveling valve fluid circuitry of the air ride suspension.

DESCRIPTION OF THE PREFERED EMBODIMENT

Figure 1:
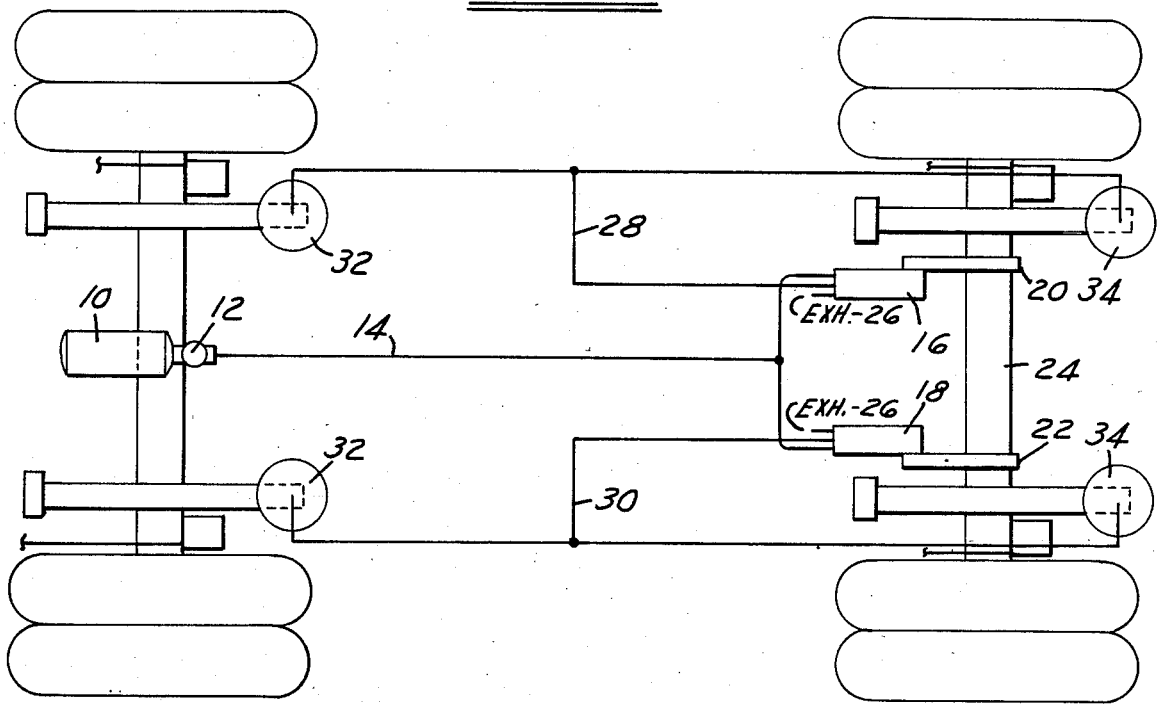
FIG 1 is a schematic fluid circuit diagram of a prior art air ride tandem truck trailer suspension; and, FIG. 2 is a schematic fluid circuit diagram of the new elevating system integrated with the air ride and spring brake system of the tandem truck trailer suspension.

FIG. 1 illustrates a simplified air ride circuit for a tandem trailer suspension including as a source of pressurized air the air brake reservoir 10 of the truck trailer combination and a brake protection valve 12. The supply of pressurized air is communicated through a bifurcated conduit 14 to a pair of leveling valves 16 and 18 adjacent to each side of the trailer suspension. The leveling valves 16 and 18 include movable arms 20 and 22 that engage one of the axles 24 of the tandem suspension. The leveling valves 16 and 18 include exhaust ports 26 and communicate with bifurcated output conduits 28 and 30. The conduits 28 and 30 each lead to a pair of air bags 32 and 34. The air bags 32 and 34 provide the air ride support for the truck trailer.

Figure 2:
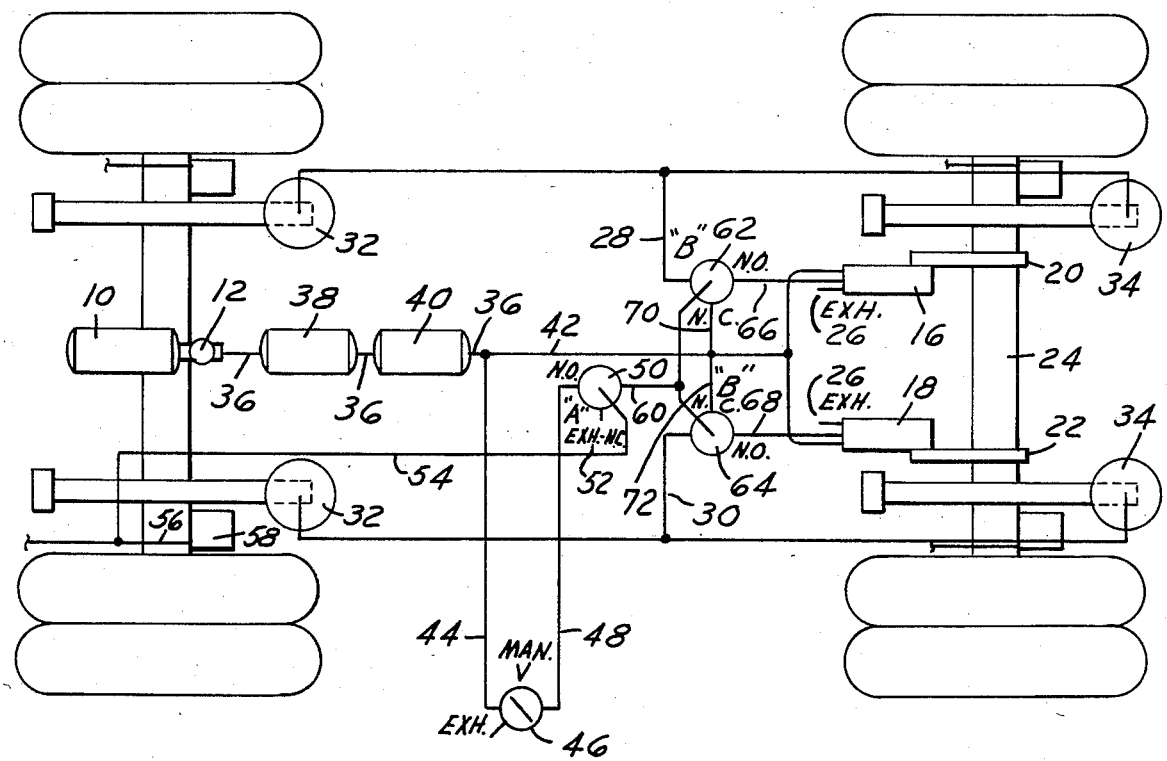

Illustrated in FIG. 2 is the new fluid circuit means to manually raise and lower the air ride suspension when the truck trailer is parked. Leading from the air brake reservoir 10 and the brake protection valve 12 is a conduit 36 which includes optional additional pressurized air reservoirs 38 and 40. The conduit 36 is branched into two separate conduits 42 and 44, the first of which supplies air to the leveling valves 16 and 18 and the second of which supplies pressurized air to the manually operable valve 46 conveniently located on the outside of the truck trailer.

The manual valve (NEWAY Part No. 90054088, manufactured by NEWAY Division, Lear Siegler, Inc., Muskegon, Mich.) outlet conduit 48 communicates with a normally open port of a pilot controlled valve 50. The pilot controlled valve 50 (NEWAY Part No. 90054079) is plumbed with a normally closed exhaust port 52 and a pilot line 54. The pilot line 54 communicates with the high pressure air line 56 leading to the spring brake chamber 58 of one of the tandem suspension parking brakes. The output port of the valve 50 communicates through a bifurcated conduit 60 leading to the pilots of a pair of valves 62 and 64 that preferably are valves identical to the valve 50 (NEWAY Part No. 90054079).

The normally open port of the valve 62 communicates through conduit 66 with the leveling valve 16 and the normally open port of the valve 64 communicates through conduit 68 with the leveling valve 18. The normally closed port of the valve 62 and the normally closed port of the valve 64 both are in fluid communication with the conduit 42 through the conduits 70 and 72 respectively. The output ports of the fluid valves 62 and 64 are in fluid communication through the conduits 28 and 30 respectively with the front 32 and rear 34 air bags of the tandem suspension.

With the truck trailer parked and the spring brake line 56 upressurized, the spring brake chamber 58 is also unpressurized and the parking brake is set to prevent movement of the truck trailer. The manual valve 46 may be operated to provide pressurized air through valve 50 and conduit 60, the valve 50 input from conduit 48 being normally open. The pressurized air in line 60 actuates the pilots in valves 62 and 64 to open the normally closed ports in valves 62 and 64 leading to the conduits 70 and 72 and to the conduit 42. Pressurized air is supplied directly through the outlets of valves 62 and 64 and through the conduits 28 and 30 to the air bags 32 and 34 thereby bypassing the leveling valves 16 and 18.

Thus, the air pressure in air bags 32 and 34 can be manually controlled by the manual valve 46 to raise and lower the bed of the truck trailer.

To manually depressurize the elevating system, the manual valve 46 is returned to off, exhausting the pressurized air in conduits 48 and 60 and thereby releasing the pilots in valves 62 and 64. Release of the pilots in valves 62 and 64 returns the ports leading to conduits 70 and 72 to the normally closed position and the ports leading to the conduits 66 and 68 to the normally open position. Thus, the front and rear air bags 32 and 34 on each side of the tandem suspension are in fluid communication through conduits 28 and 30 respectively, valves 62 and 64 respectively and conduits 66 and 68 respectively with the leveling valves 16 and 18 for normal operation of the air bag suspension.

To prevent operation of the elevating system when the parking brake is not set or the truck trailer is in motion, the conduit 54 provides a safety interlock with the air brake system of the truck trailer. Pressurization of the air brake system of the truck trailer includes pressurization of the air brake line 56 to release the parking brake by pressurizing the spring brake chamber 58. Thus, the conduit 54 is pressurized at any time the parking brakes are released.

The pressurization of the conduit 54 actuates the pilot in valve 50 closing the normally open port to conduit 48 and opening the normally closed port to exhaust 52. The conduit 60 is thereby open to exhaust 52 preventing actuation of the pilots in valves 62 and 64. Thus, even if the operator forgets to open the manual valve 46 to exhaust and boards the truck to move the truck and truck trailer, his action is pressurizing the air brake system of the truck and truck trailer will automatically release the elevating system of the truck trailer and return the air ride suspension to normal operation and control by the leveling valves 16 and 18.

Although the elevating system above described utilizes NEWAY valves and is adapted for the NEWAY AR 75-9 air ride suspension for a tandem truck trailer, the elevating system is not specifically limited thereto but may be applied to raise and lower other air bag suspension tandem trailer units or air ride units for other combinations of single or multiple axle trailer and truck suspensions.

I claim:

1. In combination with vehicle suspension means on at least one axle for supporting the vehicle bed and automatic means in engagement with the vehicle suspension means to control the height and roll of the vehicle bed, the improvement characterized by, means to manually expand and contract the suspension means thereby raising and lowering the bed of the vehicle, said manual means comprising means to bypass the automatic control of the height of the suspension means, manually controllable means in communication with the bypass means to actuate the bypass means and means in communication with said manually controllable means and the vehicle brakes whereby said manually controllable means are operable to actuate the bypass means only when the vehicle brakes are engaged.

2. In combination with vehicle air ride suspension means on at least one axle for supporting the vehicle bed, the vehicle having a pressurized air supply and air brakes, at least one control valve in fluid communication with said air ride suspension means and in fluid communication with the vehicle pressurized air supply, pilot control means on said control valve adapted to directly connect through said control valve said vehicle pressurized air supply to said air ride suspension means, a manually operable fluid valve in communication with said vehicle pressurized air supply and said pilot control means, and, second control valve means in communication with said vehicle air brakes and in fluid communication with said pilot control means, said second control valve means adapted to release said pilot control means upon air pressurization of the vehicle air brakes.

3. The combination of claim 2 wherein said second control valve means includes second pilot control means in fluid communication with the pressurizeable air supply to at least one air brake.

4. In combination with the air ride suspension means for supporting a truck trailer bed on at least one axle, said air ride suspension means comprising at least two air bag springs, a pair of leveling valves in engagement with said axle, a pair of first fluid conduits, each of said first fluid conduits communicating between one of said leveling valves and at least one air bag spring, a supply of pressurized air, and a second fluid conduit communicating between said supply of pressurized air and said pair of leveling valves, the improvement comprising a first control valve in each of said first fluid conduits, said first control valve in fluid communication with said pressurized air supply and having first pilot control means to optionally directly connect said air supply to said air bag springs, a second control valve in fluid communication with said first pilot control means, said second control valve having second pilot control means in fluid communication with the pressurizeable air supply to at least one air brake, and, a manual control valve in fluid communication with said pressurized air supply and said second control valve.

5. The combination of claim 4 including exhaust means on said second control valve, whereby actuation of said second pilot control means by pressurization of said air supply to said air brake exhausts said second control valve thereby preventing actuation of or releasing said first pilot control means.

6. The combination of claim 4 wherein actuation of said manual control valve supplies pressurized air through said second control valve to actuate said first pilot control means, said second pilot control means being unactuated by said air supply to said air brake and wherein said manual control valve includes exhaust means to release said first pilot control means.

* * * * *

UNITED STATES PATENT AND TRADEMARK OFFICE
CERTIFICATE OF CORRECTION

PATENT NO. : 4,558,886
DATED : December 17, 1985
INVENTOR(S) : Gerald J. Straub

It is certified that error appears in the above-identified patent and that said Letters Patent are hereby corrected as shown below:

Column 1, line 46: Insert --bags of the air-- after "air".

Signed and Sealed this

Eleventh Day of March 1986

[SEAL]

Attest:

DONALD J. QUIGG

Attesting Officer

Commissioner of Patents and Trademarks